United States Patent
McNicol et al.

(10) Patent No.: US 9,900,124 B2
(45) Date of Patent: Feb. 20, 2018

(54) PERIODIC SUPERCHANNEL CARRIER ARRANGEMENT FOR OPTICAL COMMUNICATION SYSTEMS

(75) Inventors: John D. McNicol, Ottawa (CA); Michael Francis Van Leeuwen, Bethesda, MD (US)

(73) Assignee: Infinera Corporation, Sunnyvale, CA (US)

( * ) Notice: Subject to any disclaimer, the term of this patent is extended or adjusted under 35 U.S.C. 154(b) by 1070 days.

(21) Appl. No.: 13/078,895

(22) Filed: Apr. 1, 2011

(65) Prior Publication Data
US 2012/0251121 A1 Oct. 4, 2012

(51) Int. Cl.
*H04J 14/02* (2006.01)
*H04J 14/06* (2006.01)

(52) U.S. Cl.
CPC .............. *H04J 14/06* (2013.01); *H04J 14/02* (2013.01); *H04J 14/0256* (2013.01); *H04J 14/0209* (2013.01); *H04J 14/0212* (2013.01); *H04J 14/0213* (2013.01)

(58) Field of Classification Search
CPC .................................................. H04J 14/0213
USPC ....................................................... 398/82, 83
See application file for complete search history.

(56) References Cited

U.S. PATENT DOCUMENTS

| | | | |
|---|---|---|---|
| 2002/0146047 A1* | 10/2002 | Bendett et al. | 372/40 |
| 2002/0186435 A1* | 12/2002 | Shpantzer et al. | 359/136 |
| 2006/0002438 A1* | 1/2006 | Brown | 372/32 |
| 2006/0029398 A1* | 2/2006 | Liu et al. | 398/188 |
| 2008/0075463 A1* | 3/2008 | Nakamoto | 398/79 |
| 2012/0087657 A1* | 4/2012 | Jander et al. | 398/48 |
| 2012/0170937 A1* | 7/2012 | Van Leeuwen | 398/76 |

* cited by examiner

*Primary Examiner* — Shi K Li
(74) *Attorney, Agent, or Firm* — David L. Soltz

(57) ABSTRACT

Consistent with the present disclosure, data, in digital form, is received by a transmit node of an optical communication system, is processed and then output to drive a modulator. The modulator, in turn, modulates light at one of a plurality of wavelengths in accordance with the received data, forming a plurality of corresponding carriers. The plurality of wavelengths used for the plurality of carriers are spectrally spaced apart by a common, periodic fixed spacing. The plurality of carriers are optically combined with a fixed spacing combiner to form a superchannel. A plurality of superchannels are generated and then multiplexed together onto an optical communication path and transmitted to a receive node. Each superchannel includes a plurality of carriers, each spectrally separated by the same fixed spacing. The plurality of superchannels are spectrally separated by an amount corresponding to the fixed spacing of the plurality of carriers. At the receive node, the superchannels are optically demultiplexed, and the plurality of carriers of a respective superchannel are then supplied to a photodetector circuit, which receives additional light at one of the optical signal carrier wavelengths from a local oscillator laser. The resultant signals are then processed electronically to separate the individual carriers and output data corresponding to the input data.

12 Claims, 11 Drawing Sheets

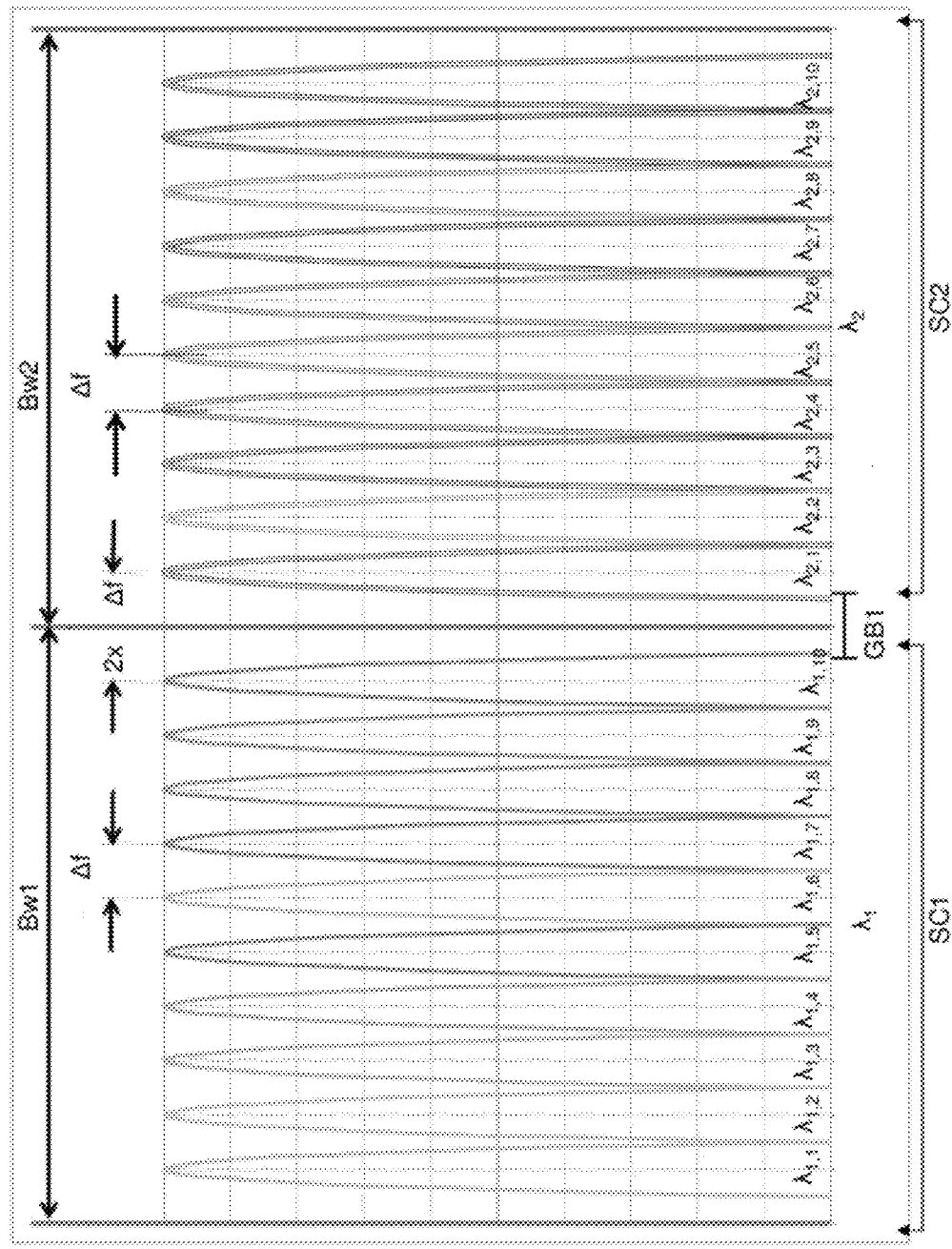

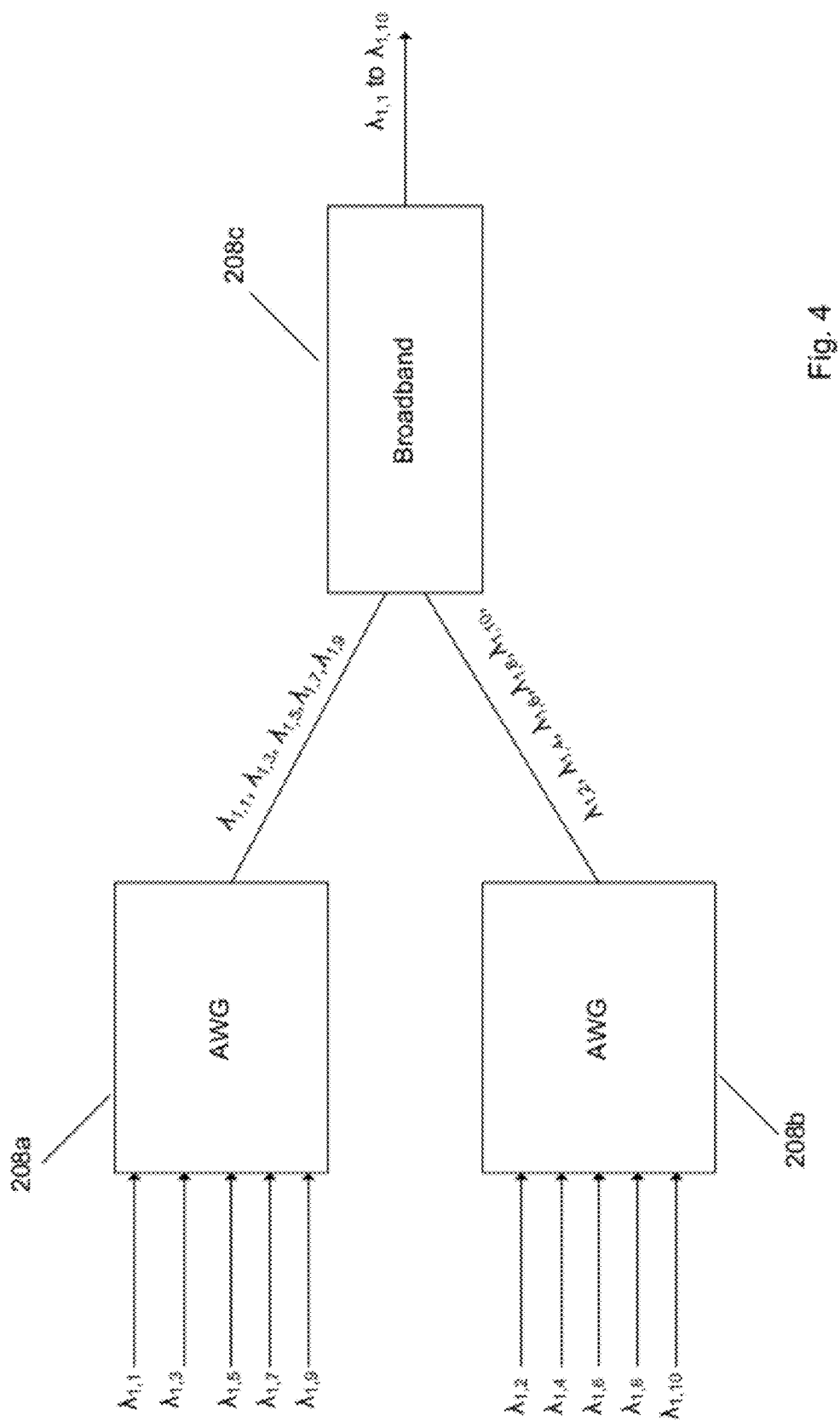

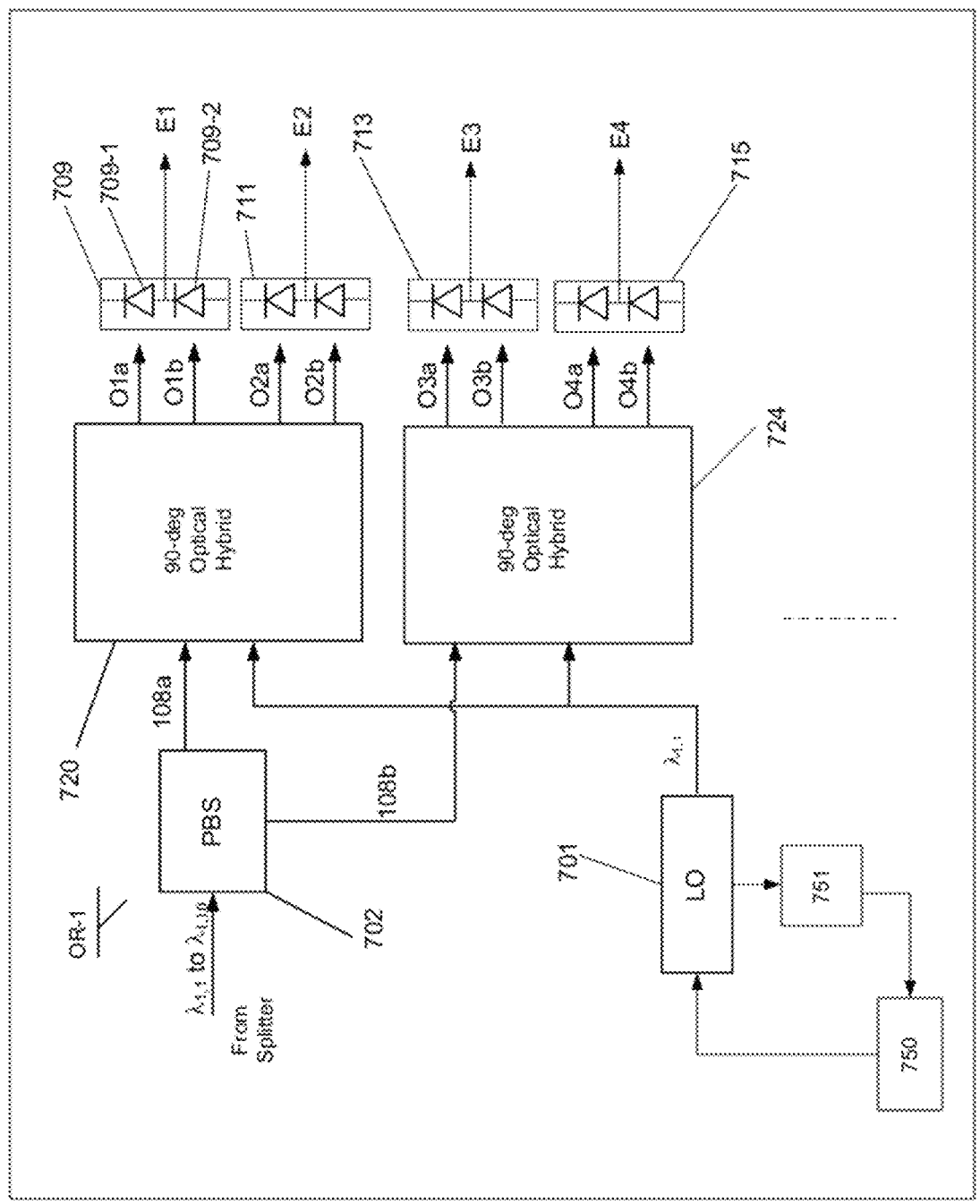

PERIODIC SUPERCHANNEL CARRIER ARRANGEMENT FOR OPTICAL COMMUNICATION SYSTEMS

BACKGROUND OF THE DISCLOSURE

Wavelength division multiplexed (WDM) optical communication systems are known in which multiple optical signals or channels, each having a different wavelength, are combined onto an optical fiber. Such systems typically include a laser associated with each wavelength, a modulator configured to modulate the optical signal output from the laser, and an optical combiner to combine each of the modulated optical signals. Such components are typically provided at a transmit end of the WDM optical communication system to transmit the optical signals onto the optical fiber. At a receive end of the WDM optical communication system, the optical signals are often separated and converted to corresponding electrical signals that are then processed further.

Known WDM optical communication systems are capable of multiplexing 40 channels at 100 GHz spacing or 80 channels at 50 GHz spacing. These WDM optical communication systems occupy an overall bandwidth of 4000 GHz. At 50 GHz channel spacing and 100 GHz channel spacing, the occupied optical fiber bandwidth or spectrum is not efficiently used. As rapid growth of the Internet continues, and new applications arise, there is an increasing demand for higher data rates provided by underlying networks, which may be supported by advances in optical communication systems. Due to the increased demand, the information carrying capacity of an optical fiber preferably should also increase. As used herein, the terms "carrier," "channel" and "optical signal" may be used interchangeably.

One method to increase the data capacity of the occupied optical fiber bandwidth is to employ higher data rate modulation formats to modulate the optical signals or channels to carry data at higher rates. Such higher rate modulation formats, however, are typically more susceptible to noise, and, therefore, may not be used in transmission of optical signals over relatively long distances. Thus, the modulation format must be chosen according to a desired reach, or distance, the transmitted channels are expected to span. Other known systems, commonly called dense wavelength-division multiplexing systems (DWDM), are capable of increasing the total data capacity by packing even more densely, additional channels on an optical fiber by more closely spacing the channels together, such as at 25 GHz spacing between channels. While 25 GHz channel spacing is an improvement over 50 GHz and 100 GHz spacing, further improvement is still needed to meet the demands of increased data rates.

Conventional DWDM systems for optical communications typically conform to a wavelength or frequency grid defined by the International Telecommunications Union (ITU). The most common frequency grid is that used for channel spacing at wavelengths around 1550 nm as defined by ITU-T G.694.1 (2002). The ITU grid is defined relative to 193.1 THz and extends from 191.7 THz to 196.1 THz with 100 GHz periodic spacing between adjacent channels. Recently, however, as optical technology has improved, the frequency grid has practically been extended to cover 186 THz to 201 THz and is sub-divided to provide the 50 GHz and 25 GHz spaced channels discussed above. Because the ITU grid is an accepted standard, many optical components used in known optical communication systems have been developed and optimized to conform to the ITU defined frequency channels and their periodic spacing. However, conforming to such a restrictive frequency grid, while convenient, may undesirably limit the data carrying capacity of an optical communication system.

Preferably, the information carrying capacity of an optical communication system should be optimized to carry a maximum amount of data over a maximum length of optical fiber while efficiently utilizing the bandwidth supported by available optical components, such as optical amplifiers, for example. Accordingly, individual carrier or channel spacing should be minimized according to the available optical components and transmitter and receiver technology capable of reliably transmitting and receiving such minimally spaced channels. Therefore, a greater number of channels can be packed in a given bandwidth, resulting in more efficient use of network resources and the occupied optical spectrum of the channels. Accordingly, increased data demands of the network drive a need to provide a plurality of minimally spaced carriers to increase optical communication system network capacity. Additionally, unique customer requirements provide a need to flexibly group the plurality of minimally spaced carriers together in blocks or "superchannels" that can be individually routed throughout the network and that can be multiplexed with other blocks of similar minimally spaced carriers. Furthermore, in order to utilize the convenience of available optimized optical components and to simplify transmitter and receiver architecture, there is a need to configure such superchannels with periodic fixed spaced carriers.

SUMMARY OF THE DISCLOSURE

Consistent with one aspect of the present disclosure, an apparatus is provided comprising a first optical transmitter configured to supply a plurality of first optical signals, each of the plurality of first optical signals being spaced apart from one another spectrally by a first spacing, the plurality of first optical signals constituting a first superchannel, each of the plurality of first optical signals having a corresponding one of a plurality of first wavelengths. A second optical transmitter is provided and is configured to supply a plurality of second optical signals, each of the plurality of second optical signals being spaced apart from one another spectrally by the first spacing, the plurality of second optical signals constituting a second superchannel, each of the plurality of first optical signals having a corresponding one of a plurality of second wavelengths. A multiplexer is also provided and is configured to combine the first superchannel and the second superchannel, wherein a maximum one of the plurality of first wavelengths and a minimum one of the plurality of second wavelengths are spaced apart spectrally from one another by a second spacing in accordance with the first spacing.

Consistent with another aspect of the present disclosure, an apparatus is provided comprising a plurality of optical sources, each configured to supply a plurality of optical signals, each of the plurality of optical signals being spaced apart from one another spectrally by a first spacing. The apparatus also includes an optical combiner configured to combine a first subset of the plurality of optical signals, the first subset constituting a first superchannel, and to combine a second subset of the plurality of optical signals, the second subset defining a second superchannel. A multiplexer is also provided and is configured to combine the first superchannel and the second superchannel onto an optical communication path, the first and second superchannel being spaced apart by a spacing indicative of the first spacing.

Consistent with yet another aspect of the present disclosure, an apparatus is provided comprising a first plurality of optical sources, each of which supplying a corresponding one of a first plurality of optical signals, each of the first plurality of optical signals having a corresponding one of a first plurality of wavelengths. The apparatus includes a second plurality of optical sources, each of which supplying a corresponding one of a second plurality of optical signals, each of the second plurality of optical signals having a corresponding one of a second plurality of wavelengths. An optical multiplexer is provided and is configured to receive the first plurality of optical signals and the second plurality of optical signals, and combine the first and second pluralities of optical signals onto an optical communication path, wherein each of the first plurality of wavelengths are spectrally spaced from one another by a first spacing, and each of the second plurality of optical signals is spectrally spaced from one another by the first spacing, a maximum one of the first plurality of wavelengths being spaced from a minimum one of the second plurality of wavelengths by a second spacing that is greater than the first spacing.

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) of the invention and together with the description, serve to explain the principles of the invention.

BRIEF DESCRIPTION OF THE DRAWINGS

FIG. 1b illustrates a wavelength plan for a superchannel transmitted in an optical communication system consistent with aspects of the present disclosure;

FIG. 4 illustrates a block diagram of a multiplexer arrangement consistent with an aspect of the present disclosure;

FIG. 7 illustrates a portion of a receiver photonic integrated circuit (PIC) consistent with the present disclosure.

DESCRIPTION OF THE EMBODIMENTS

Figure 1A:
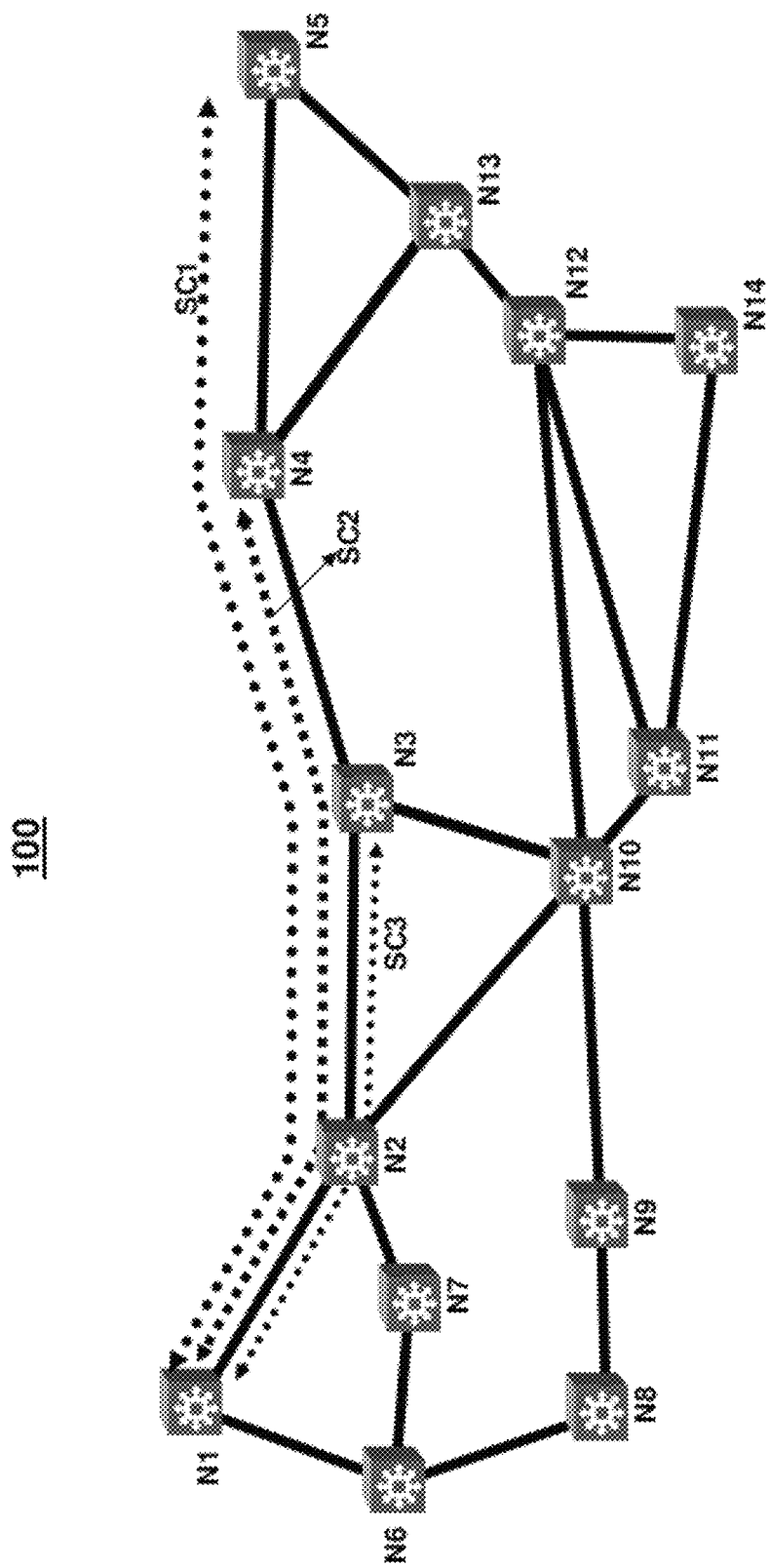
FIG. 1a illustrates an optical communication system consistent with aspects of the present disclosure.

Consistent with the present disclosure, data, in digital form, is received by a transmit node of an optical communication system, and converted to an analog signal by a digital-to-analog converter (DAC) to drive a modulator. The modulator, in turn, modulates light, received from an optical source at one of a plurality of periodically and preferably minimally spaced wavelengths, in accordance with the received data. The plurality of periodically spaced wavelengths or carriers are grouped together with a fixed spacing combiner, for example, to form a superchannel. A plurality of superchannels are then multiplexed and transmitted over an optical communication path to a receive node. The multiplexed superchannels are preferably spaced apart from each other by a spacing consistent with the periodic spacing of the individual wavelengths or carriers. At the receive node, the multiplexed superchannels are demultiplexed by an optical demultiplexer and provided to a plurality of corresponding demodulators. Prior to demodulation, each superchannel may be demultiplexed using one or more filter based demultiplexers to separate the plurality of minimally and periodically spaced carriers. The demultiplexed superchannels, or carriers, may then be intradyned in a known manner by combining them with light from a plurality of local oscillators tuned to each of the minimally spaced wavelengths to provide a baseband optical signal for each carrier. The baseband optical signals are supplied to corresponding photodetectors, which, in turn, supply analog electrical signals (representative of a known "down-converted" signal), that may be amplified or otherwise processed, and provided to an analog-to-digital converter (ADC). The ADC converts the processed analog electrical signals into digital form. The output from the ADC is then further processed to generate a copy of the data supplied to the transmit node.

In particular, such processing may include filtering electrical signals generated in response to the ADC outputs in order to select data associated with one of the plurality of modulated optical signals or carriers. Because the exemplary detection methods convert the individual carriers to a baseband signal according to a tuned LO, the data in the baseband signal can be reliably filtered using electrical filtering components and techniques. Since filtering is carried out electronically, i.e., in the electrical domain, instead of optically, fixed optical demultiplexers are not required to demultiplex the minimally spaced carriers. Thus, the electrical filtering of the optical carriers may be readily tuned by circuitry in the transmit and receive nodes, such that the optical signals carrying such data may be spectrally spaced closer to one another.

The plurality of carriers in each superchannel are preferably periodically spaced, thus forming a unique nonstandard periodic grid. Such periodic spacing between the carriers in each superchannel enables the use of a common wavelength or frequency spacing for the optical components in the optical communications system. For example, a filter based optical multiplexer and demultiplexer with a fixed spacing frequency response can be used to demultiplex the carriers for each superchannel. Additionally, an optical etalon, or a periodic wavelength locking component, can be used for frequency or wavelength locking the optical sources and local oscillators at each of the periodically spaced frequencies for each superchannel. Accordingly, the use of a common optical component for each of the superchannels improves stability of the transmit and receive node functionality, and greatly reduces the number of components needed in the transmit and receive nodes thereby reducing the complexity of the optical communication system.

Thus, consistent with the present disclosure, in order to increase the data carrying capacity of an optical channel, a plurality of periodically spaced carriers are provided within a single channel or superchannel according to a nonstandard periodic grid. A plurality of superchannels may be multiplexed together for transmission in the optical communication system. In order to utilize the advantages of the standard ITU grid, each superchannel may occupy a bandwidth that is a multiple of known ITU grid spacings, such as a multiple of 25 GHz. Further, in order to enable optical switching and routing of the plurality of superchannels in the network, the superchannels are preferably separated by a spectral guard band or a spacing occupied by an unused carrier with a frequency range consistent with the periodic wavelength or frequency spacing of the other carriers. Accordingly, a carrier plan or frequency plan in each superchannel is provided that enables the use of periodic or fixed frequency spacing optical components in the transmitter and receiver to reduce complexity of the optical communication system.

It is common and understood that optical signals can be described in terms of their transmitted frequency or wavelength. Throughout this disclosure, both of these terms may be used to describe the same signal or characteristic of a signal. For example, in FIG. 1b, a plurality of carriers are identified by their wavelength, whereas the spacing between the individual carriers is described with respect to frequency.

Reference will now be made in detail to the present exemplary embodiments of the present disclosure, which are illustrated in the accompanying drawings. Wherever possible, the same reference numbers will be used throughout the drawings to refer to the same or like parts.

An optical communication system 100 is shown in FIG. 1a. As shown, optical communication system 100 comprises a plurality of interconnected nodes N1 to N14 that may span across the United States, for example. Each node, e.g., N1 to N14, may enable high capacity WDM optical transport and digital add/drop flexibility for multiplexing a plurality of optical signals traversing the optical communication system 100. Optical signals are preferably grouped according to a plurality of superchannels SC1, SC2, for example, as described with respect to FIG. 1b below. Each node N1 to N14 preferably uses the exemplary systems and methods discussed below to transmit and receive superchannels, SC1, SC2, and SC3, in the optical communication system 100. The exemplary systems and methods discussed below enable nodes N1 to N14 to convert optical signals received from interconnected nodes to the electrical domain for processing, and then convert the electrical signals back into optical signals for forwarding to other interconnected nodes. Thus, key network functions in each node N1 to N14 are enabled by electronic components and processes, not complex optical components. Accordingly, the optical bandwidth attendant with a node can, therefore, be easily and effectively managed to maximize service flexibility, enable rapid network reconfigurability and simplify network engineering and operations. The exemplary optical communication system 100 can be implemented by deploying nodes, N1 to N14, anywhere in the network where access is desired. Some nodes may even be implemented, such as shown with respect to node N2 in FIG. 1a, to simply route or pass one or more superchannels, SC1, SC2 and SC3, to other nodes in the network without processing the data that is carried by the superchannels. Some exemplary systems and methods implemented in nodes, N1 to N14, are further discussed below.

Figure 2A:
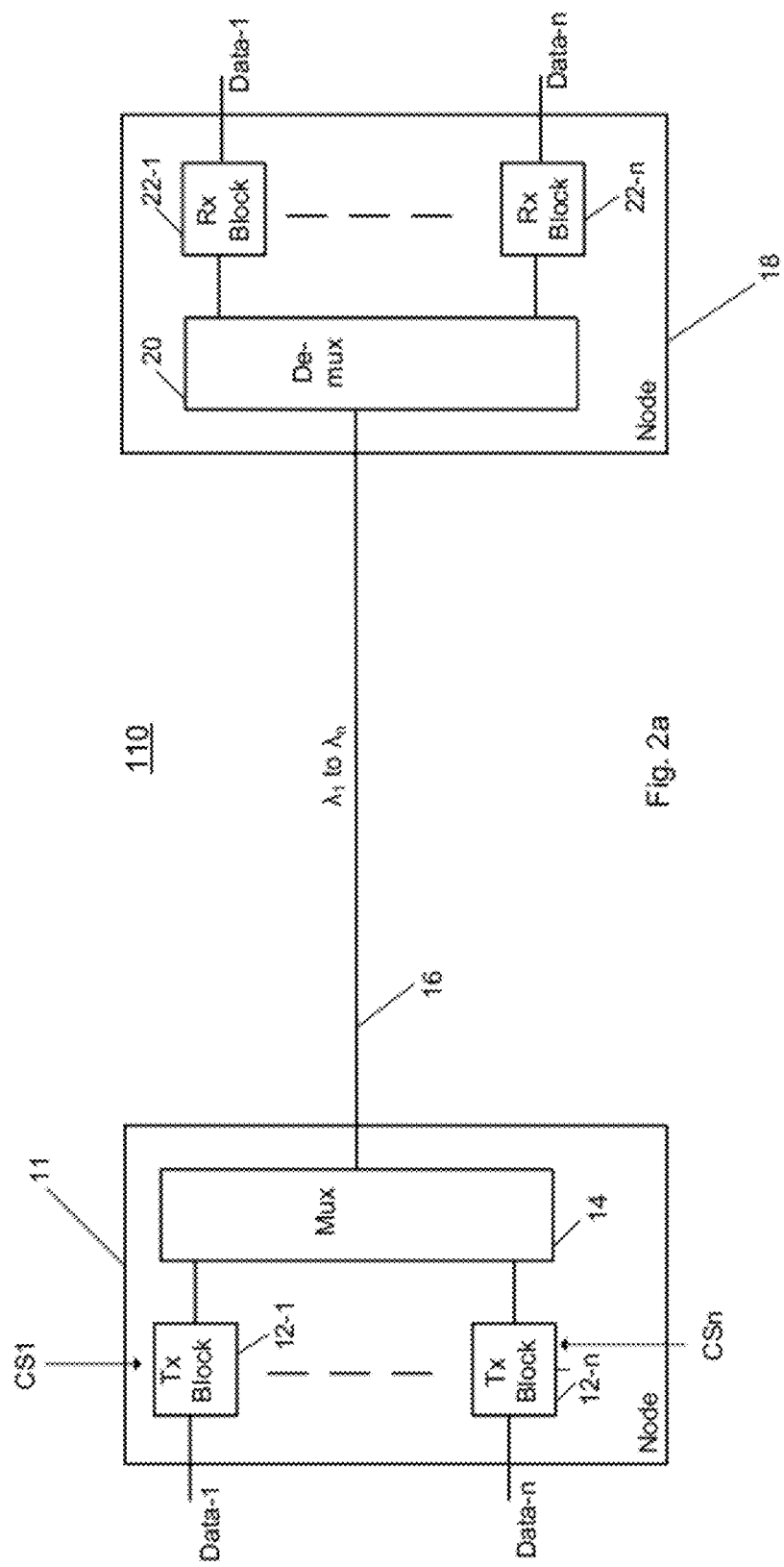
FIGS. 2a, 2b and 2c illustrate an optical link consistent with aspects of the present disclosure.

FIG. 2a illustrates an optical link 110 provided between a transmit node 11 and a receive node 18, such as between nodes N1 and N3, for example, as part of an optical communication system 100 consistent with an aspect of the present disclosure. Transmit node 11 (N1 in this example) may include a plurality of transmitter blocks (Tx Block) 12-1 to 12-n. The same or similar transmitter blocks may also be provided in any of remaining nodes N2 to N14. Each of transmitter blocks 12-1 to 12-n receives a corresponding one of a plurality of data or information streams, Data-1 to Data-n, and, in response to a respective one of these data streams, each of transmitter blocks 12-1 to 12-n outputs a group or band of optical signals or carriers to a combiner or multiplexer 14. Accordingly, in the exemplary embodiment, each transmitter block 12-1 to 12-n outputs a superchannel comprising a band of a plurality of sub-wavelength channels or optical carriers, as shown in FIG. 1b. Each superchannel carries an information stream or data corresponding to each of data streams Data-1 to Data-n, respectively.

The optical signals or carriers included in each group or band are centered around a wavelength or frequency specified by the International Telecommunications Union (ITU) standard wavelength or frequency grid. Alternatively, each of the optical carriers is provided according to a unique nonstandard grid that is optimized for a specific embodiment. For example, as shown in FIG. 1b, a plurality of optical signals or carriers $\lambda 1,1$ to $\lambda 1,10$ are grouped or banded together to form a superchannel SC1, and a plurality of optical signals or carriers $\lambda 2,1$ to $\lambda 2,10$ are grouped or banded together to form a superchannel SC2. As shown, the plurality of sub-wavelength channels $\lambda 1,1$ to $\lambda 1,10$ and $\lambda 2,1$ to $\lambda 2,10$ are closely spaced so as to optimize the occupied bandwidth BW1 and BW2 of the superchannels SC1 and SC2, respectively. Each carrier $\lambda 1,1$ to $\lambda 1,10$ and $\lambda 2,1$ to $\lambda 2,10$ of SC1 and SC2, respectively, may be considered a sub-wavelength channel banded around a center wavelength $\lambda 1$ and $\lambda 2$ identifying the superchannels SC1 and SC2, respectively. As described above, each of the superchannels SC1 and SC2 may be multiplexed or independently routed through the optical communication system 100 shown in FIG. 1a.

In an exemplary embodiment, as discussed further below with respect to FIGS. 2a, 2b and 2c, the plurality of sub-wavelength channels or carriers $\lambda 1,1$ to $\lambda 1,10$ and $\lambda 2,1$ to $\lambda 2,10$ are preferably periodically spaced from each other by a fixed frequency spacing according to an embodiment specific unique frequency grid. In other words, as shown in FIG. 1b, a corresponding frequency spacing between the center wavelengths $\lambda 1,1$ and $\lambda 1,2$, shown as $\Delta f$, is the same for each of the other carriers in a superchannel. Thus, each of the carriers are said to be periodically spaced from each other by $\Delta f$. Because a transmit node 11 can produce a plurality of superchannels $\lambda 1$ to $\lambda n$, as shown in FIG. 2a, in order to utilize common optical components for each superchannel, it is preferred that the carriers for each superchannel utilize the same fixed frequency spacing $\Delta f$ as shown in FIG. 1b.

It is understood, as further described below, that the characteristics of optical components, such as a DFB laser 508 shown in FIG. 5 and various other optical filters, can vary with respect to temperature and other environmental conditions. Thus, throughout the disclosure where a "fixed" frequency or wavelength spacing is described, such fixed spacing is a theoretical or ideal fixed spacing that is desired, but may not be achieved exactly due to environmental conditions. Thus, any substantially similar spacing, frequency or wavelength within expected optical component variations may correspond to the ideal fixed spacing described.

Referring back to FIG. 2a, a multiplexer 14, which in accordance with this embodiment includes one or more optical filters or broadband combiners, for example, combines each of the groups of optical signals or superchannels onto optical communication path 16. Optical communication path 16 includes one or more segments of optical fiber and optical amplifiers, for example, to optically amplify or boost the power of the transmitted optical signals. As shown, a receive node 18 includes a demultiplexer 20 for demultiplexing the received superchannels. According to one embodiment, demultiplexer 20 at the receive node 18 may include one or more optical filters, for example. Optical demultiplexer 20 supplies each superchannel or group of received optical signals to a corresponding one of receiver blocks (Rx Blocks) 22-1 to 22-n. Each of receiver blocks 22-1 to 22-n, in turn, supplies a corresponding copy of data or information streams Data-1 to Data-n in response to the optical signals. It is understood that each of transmitter blocks 12-1 to 12-n has the same or similar structure and each of receiver blocks 22-1 to 22-n has the same or similar structure.

Figure 2B:
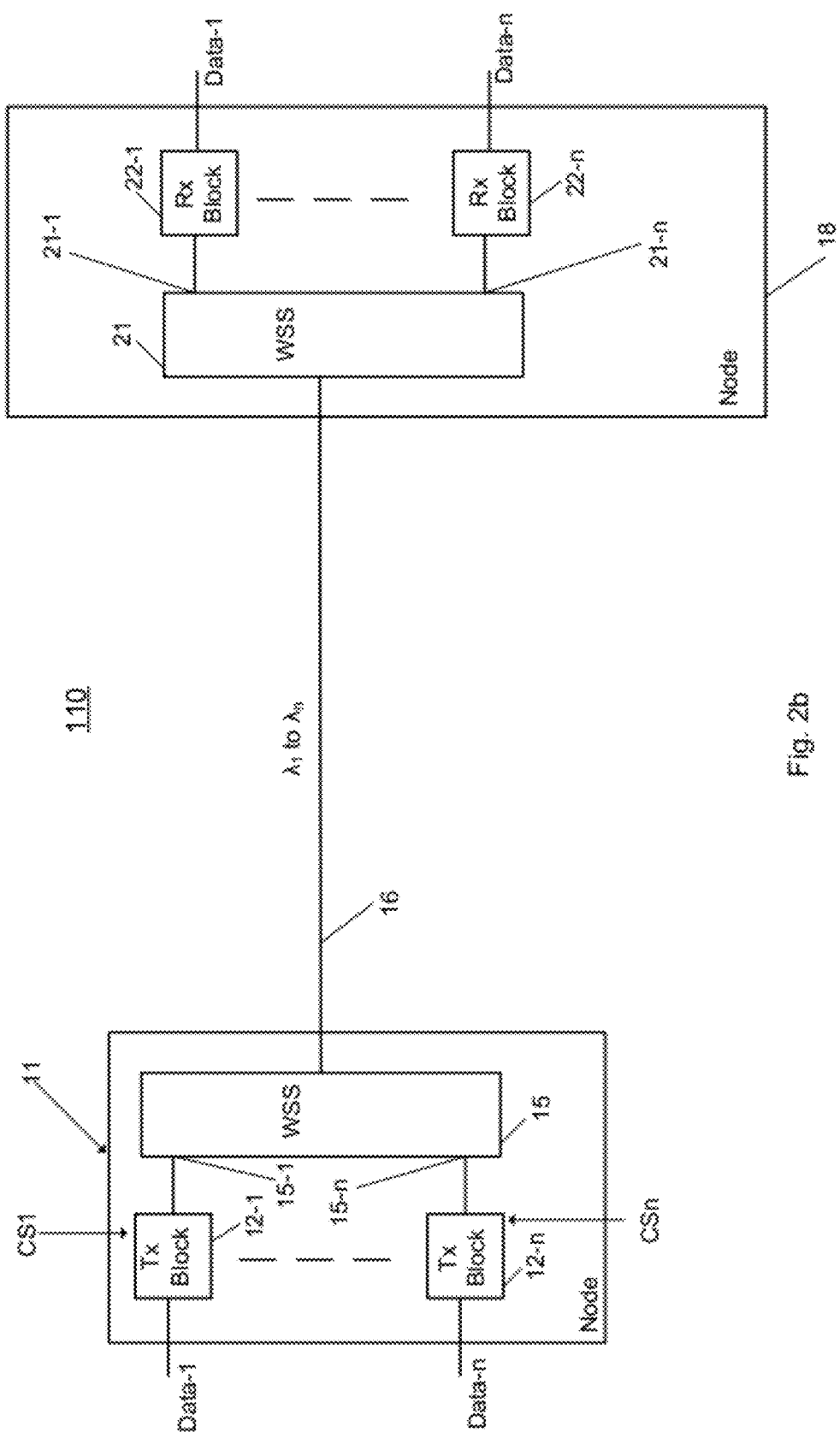

In some embodiments, demultiplexer 20 may be substituted with a wavelength selective switch (WSS) 21, as shown in FIG. 2b. As generally understood, and depending on system requirements, WSS 21 may be configured to output from a first port 21-1, a first superchannel from path 16 having a wavelength within a first range or optical bandwidth and output a second superchannel with a wavelength within a second range from a second port 21-n. Consistent with the present disclosure, additional optical signals or superchannels having associated bandwidths are supplied from either one or both ports 21-1 and 21-n in order to maximize the number of optical signals or superchannels supplied from each port. The WSS 21 is preferably used in a network node, N2 for example, for routing or switching one or more superchannels between nodes N1 and N3. WSS 21 may also be used for multiplexing, adding or dropping one or more superchannels from other nodes, for example. According to some embodiments, a WSS 15 may also be substituted for the multiplexer 14 shown in FIG. 2a. WSS 15 is configured to receive at a first port 15-1 a first superchannel having a wavelength within a first range or optical bandwidth and combine it with a second superchannel having a wavelength within a second range received at a second port 15-n. The combined superchannels may then be output onto path 16.

In order to facilitate the operation of the WSS 21, an exemplary embodiment preferably utilizes a spectral guard band GB1 or unused band between adjacent superchannels as shown in FIG. 1b. The guard band GB1 enables the WSS 21 to reliably separate or filter each superchannel from an adjacent superchannel. Thus, the frequency spacing between λ1,10 and λ2,1 is unused, or a carrier is not modulated to carry any data or information at the unused frequency. As further shown in FIG. 1b, the center wavelength of edge carrier λ1,10 of superchannel SC1 is separated from the center wavelength of edge carrier λ2,1 of superchannel SC2 by a frequency spacing greater than the frequency spacing Δf between adjacent carriers in each superchannel. According to one embodiment, the guard band GB1 is chosen to conform to the unique nonstandard grid defined by the periodic frequency spacing Δf between adjacent carriers for each superchannel. As such, in one embodiment the guard band GB1 occupies the bandwidth of an unused carrier. Thus the frequency spacing between adjacent superchannels is 2× (two times) the frequency spacing Δf between the carriers of each superchannel. In other embodiments, the bandwidth of the guard band GB1 may include the combined bandwidth of any integer multiple of unused carriers, so long as the carriers of an adjacent superchannel, SC2 for example, are provided on the same periodic grid as the carriers of superchannel SC1. According to one embodiment, Δf is determined based on the bandwidth of the superchannel and the number of carriers in the superchannel. Additionally, as discussed above, a guard band is also included that corresponds to the fixed frequency spacing Δf. Thus, Δf is determined by dividing the spectral bandwidth of the superchannel by N+1, where N is the number of carriers or channels in the superchannel.

Referring back to FIG. 1a, each node N1 to N14 may be interconnected with a plurality of other nodes in the optical communication system 100. Accordingly, each node N1 to N14 is preferably configured to both transmit and receive optical signals or superchannels SC1, SC2 and SC3 from other nodes in the optical communication system 100. FIG. 2c illustrates another exemplary embodiment of an optical link 110' consistent with the present disclosure in which a node includes both transmitter blocks and receiver blocks.

Figure 2C:
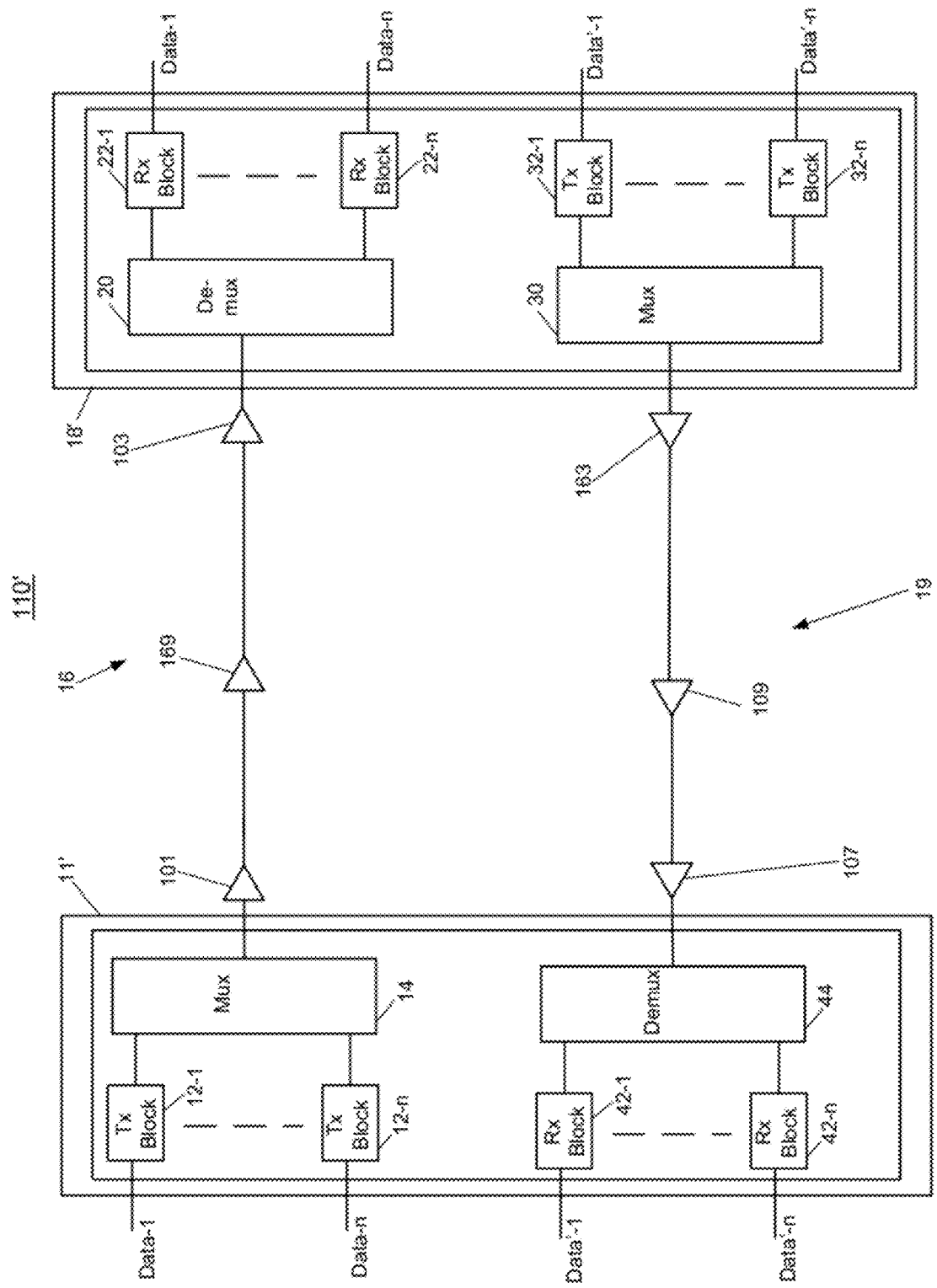

As shown in FIG. 2c, communication system 110' includes a first rack, cabinet, chassis, or housing 11', which includes a plurality of transmitter blocks (Tx Block) 12-1 to 12-n, and a plurality of receiver blocks (Rx Block) 42-1 to 42-n. Similar to the above, each of the transmitter blocks 12-1 to 12-n receives a corresponding one of a plurality of data or information streams Data-1 to Data-n, and, in response to a respective one of these data streams, each of transmitter blocks 12-1 to 12-n may output a group of optical signals or a superchannel to a combiner or multiplexer 14, which multiplexes a plurality of superchannels together onto optical communication path 16. As shown, optical communication path 16 may include one or more segments of optical fiber and optical amplifiers 101, 169, and 103, for example, to optically amplify or boost the power of the transmitted optical signals.

As further shown in FIG. 2c, the communication system 110' includes a second rack, cabinet, chassis, or housing 18', which includes a plurality of receiver blocks 22-1 to 22-n and a plurality of transmitter blocks 32-1 and 32-n. An optical combiner or demultiplexer 20 may include one or more optical filters, for example, and supply each group of received optical signals to a corresponding one of receiver blocks (Rx Blocks) 22-1 to 22-n. Each of receiver blocks 22-1 to 22-n, in turn, supplies a corresponding copy of data or information streams Data-1 to Data-n in response to the optical signals. Transmitter blocks 32-1 to 32-n and multiplexer 30 function similarly as transmitter blocks 12-1 to 12-n and multiplexer 14 provided in housing 11' in order to provide bi-directional communication via a communication path 19 between interconnected nodes N1 to N14 shown in FIG. 1a. Accordingly, receiver blocks 42-1 to 42-n and demultiplexer 44 also function similarly as receiver blocks 22-1 to 22-n and demultiplexer 20, respectively. As shown, optical communication path 19 also may include one or more segments of optical fiber and optical amplifiers 163, 109 and 107, for example, to optically amplify or boost the power of the transmitted optical signals. As shown in FIG. 2b, multiplexers 14, 30 and demultiplexers 20, 44 may be substituted with programmable WSSs 15 and 21, respectively.

Figure 3A:
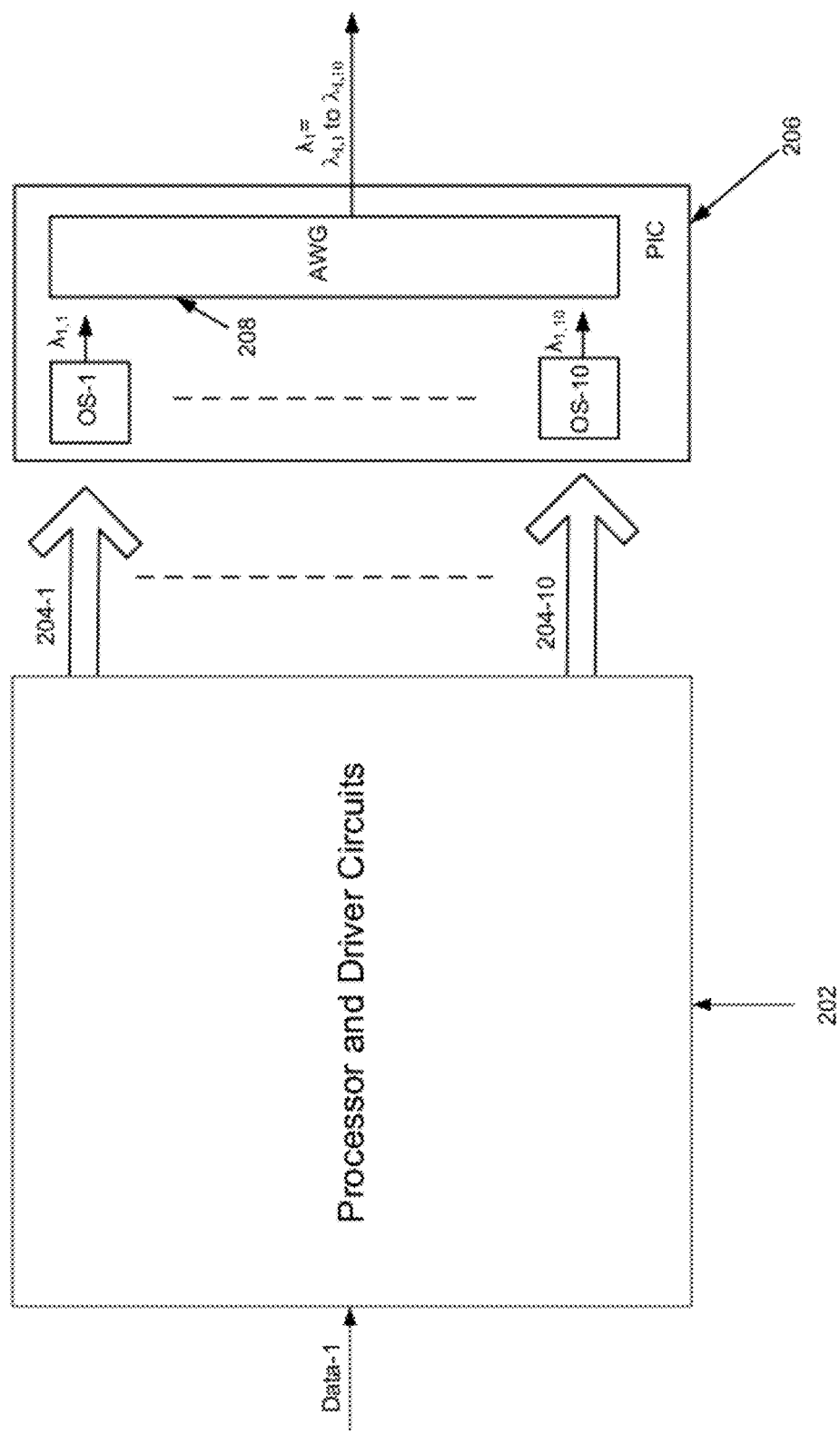
FIGS. 3a and 3b illustrate various portions of a transmitter block consistent with an additional aspect of the present disclosure.

FIG. 3a illustrates one of transmitter blocks 12-1 in greater detail. It is understood that remaining transmitter blocks 12-2 to 12-n have the same or similar structure as transmitter block 12-1. Transmitter block 12-1 includes a processing circuitry block 204 that includes a digital signal processor (DSP) and an application specific integrated circuitry (ASIC), for example, for processing incoming Data-1 and supplying corresponding outputs or electrical signals 204-1 to 204-10 to optical sources OS-1 to OS-10 provided on a transmit photonic integrated circuit (PIC) 206. Some of the functionality of processing circuitry block 204 includes sampling and filtering of the incoming digital data Data-1 and spectral shaping of the data, as well as conversion of the digital data signals into analog signals utilizing known digital-to-analog converter circuitry, for example. Processing circuitry block 204 also provides modulator driver signals that have a desired current and/or voltage for driving modulators present in PIC 206, as discussed in greater detail below with reference to FIG. 5. Additional and detailed functionality and configuration of processing circuitry block 204 is described further in U.S. patent application Ser. No. 12/897,784, titled "Wavelength Division Multiplexed Optical Communication System Having Variable Channel Spacings", filed Oct. 5, 2010, the entire contents of which are incorporated herein by reference.

As further shown in FIG. 3a, based on signals 204-1 to 204-10 each of optical sources OS-1 to OS-10 supplies a corresponding one of modulated sub-wavelength optical signals or carriers having wavelengths λ1,1 to λ1,10, respectively. As discussed further below with respect to FIG. 5, in one embodiment, the modulated sub-wavelength optical signals output from OS-1 to OS-10 are polarization multiplexed. The polarization multiplexed optical signals may then be combined by a wavelength multiplexer 208, such as an arrayed waveguide grating (AWG), for example, into a band or group of optical signals comprising a superchannel represented by λ1 supplied by output 206-1, see also FIG. 1b. Alternatively, a broadband optical combiner may be implemented as the multiplexer 208 to combine the plurality of carriers. Because the modulated sub-wavelength optical signals are minimally spaced, however, such broadband combining may result in unacceptable degradations in transmitter signal to noise ratio (SNR).

Accordingly, in an exemplary embodiment, multiplexer 208 preferably comprises a plurality of optical filters, the outputs of which may be combined by a broadband combiner. For example, as shown in FIG. 4, a first optical filter 208a may be provided to combine odd numbered carriers (e.g. λ1,1, λ1,3, λ1,5 etc.), or every other carrier, and a second optical filter 208b may be provided to combine the even numbered carriers (e.g. λ1,2, λ1,4, λ1,6 etc.) positioned between the odd numbered carriers. The first and second optical filters 208a and 208b preferably have the same periodic frequency response, with the response of filter 208b being shifted with respect to the response of filter 208a such that the response of the second filter 208b falls interstitial to the response of filter 208a. The outputs of the first and second filters 208a, 208b are then be followed by a broadband combiner 208c to combine each of the carriers to form a superchannel of wavelength λ1 that includes each of the carriers λ1,1 to λ1,10. Alternatively, the plurality of carriers can first be filtered by four filters which are then combined using a 4-way broadband combiner. It is understood that any combination or configuration of filters and combiners may be utilized in the exemplary embodiments, so long as the frequency response of the combined filters is such that there is minimal "roll-off" between adjacent carrier frequencies, such that the minimally spaced carriers can be reliably demodulated at a receive node.

According to one embodiment, because the carriers of each superchannel are periodically spaced apart at a constant or fixed frequency spacing, the functionality of the first and second filter 208a and 208b above can be provided using a single periodic or fixed spacing filter such as an AWG. It is understood that an AWG provides a fixed spacing frequency response that can be controlled to pass desired frequencies or frequency bands separated by a fixed spacing. For example, an exemplary AWG 208 is provided to filter the even carriers, as discussed above, and then can be shifted or offset in frequency such that the same AWG 208 filters the odd carriers. Such frequency shift of an AWG can be realized by controlling the temperature of the AWG, for example. Thus, it is advantageous to periodically separate each carrier by a fixed frequency such that an AWG or other fixed spacing filter can be utilized. In one embodiment, a single AWG 208 is provided for combining the carriers for each of the superchannels output from the plurality of transmit blocks 12-1 to 12-n. As discussed above, the frequency response of an AWG may vary with temperature or due to other characteristics of the AWG. In the exemplary embodiments, the AWG preferably provides a relatively stable periodic frequency response. Thus, it is understood that the desired periodic fixed frequency response of the AWG may vary due to environmental conditions as is expected and is not intended to require an absolute fixed periodic frequency response in each of the embodiments.

Although FIG. 3a illustrates ten optical sources OS-1 to OS-10, it is understood that any appropriate number of such optical sources may be provided. For example, the appropriate number of circuit blocks may be determined according to the number of sub-wavelength carriers utilized for a chosen optical bandwidth according to a specific embodiment. Additionally, as shown in FIG. 3a, optical sources OS-1 to OS-10 and multiplexer 208 are provided on a substrate 205, for example. Substrate 205 may include indium phosphide or other semiconductor materials. Moreover, it is understood, that optical sources OS-1 to OS-10, as well as multiplexer 208, may be provided as discrete components, as opposed to being integrated onto substrate 205 as PIC 206. Alternatively, selected components may be provided on a first substrate while others may be provided on one or more additional substrates in a hybrid scheme in which the components are neither integrated onto one substrate nor provided as discrete devices.

Figure 3B:
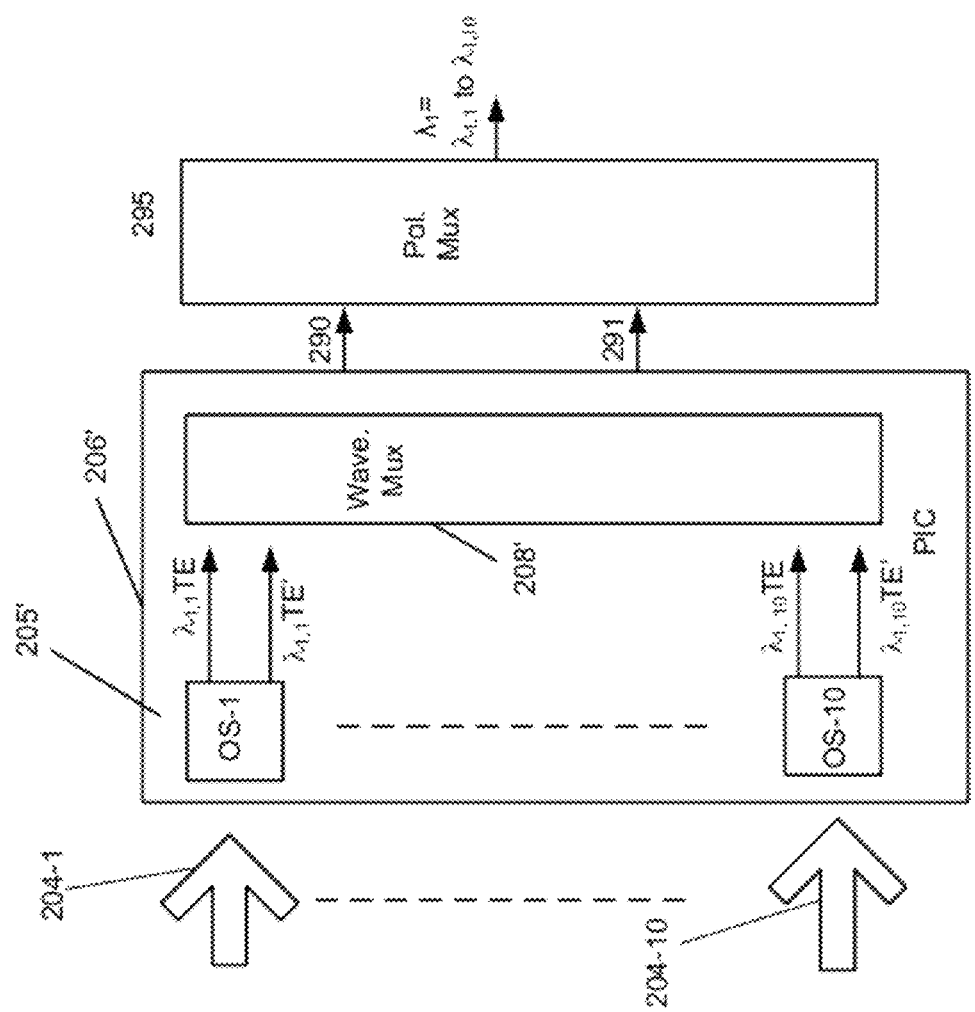

FIG. 3b illustrates an alternative embodiment of a PIC 206' according to one aspect of the present disclosure. As further shown in FIG. 3b, each of optical sources OS-1 to OS-10 may supply a corresponding pair of modulated optical signals (for example, a respective one of pairs λ1,1TE, λ1,1TE' ... λ1,10TE, λ1,10TE') to wavelength multiplexing circuitry 208'. Typically, each optical signal within a given pair has the same or substantially the same wavelength, e.g., each of optical signals λ1,1TE and λ1,1TE' have wavelength λ1,1. In one example, each of optical signals λ1,1TE to λ1,10TE are multiplexed by wavelength multiplexing circuitry 208' into a first WDM output 290 and each of optical signals λ1,1TE' to λ1,10TE' are multiplexed into a second WDM output 291. Wavelength multiplexing circuitry 208' may include one or more arrayed waveguide gratings (AWGs) and/or one or more broadband power combiners as discussed above.

The first (290) and second (291) WDM outputs may be provided to polarization multiplexing circuitry 295, including for example a polarization beam combiner. In one example, first WDM output 290 may have a transverse electric (TE) polarization and is supplied to polarization multiplexing circuitry 295 by polarization maintaining optical fiber, such that the polarization of each optical signal in the first WDM output 290 has the TE polarization upon input to polarization multiplexing circuitry 295. The second WDM output 291 may also have a TE polarization when output from wavelength multiplexer 208, but the second WDM output 291 is provided to a second polarization maintaining fiber that is twisted in such a way that the polarization of each optical signal in the second WDM output 291 is rotated, for example, by 90 degrees. Accordingly, each such optical signal has a transverse magnetic (TM) polarization when supplied to polarization multiplexing circuitry 295. Polarization multiplexing circuitry 295, in turn, combines the two WDM optical outputs to provide a polarization multiplexed WDM optical signal or superchannel of wavelength λ1 that includes carriers λ1,1 to λ1,10.

The above functionality of PIC 206', shown in FIG. 3b, is described in greater detail in U.S. patent application Ser. No. 12/981,835, titled "Method and Apparatus For Local Optimization of an Optical Transmitter", filed Dec. 30, 2010, the entire contents of which are incorporated herein by reference.

Figure 5:
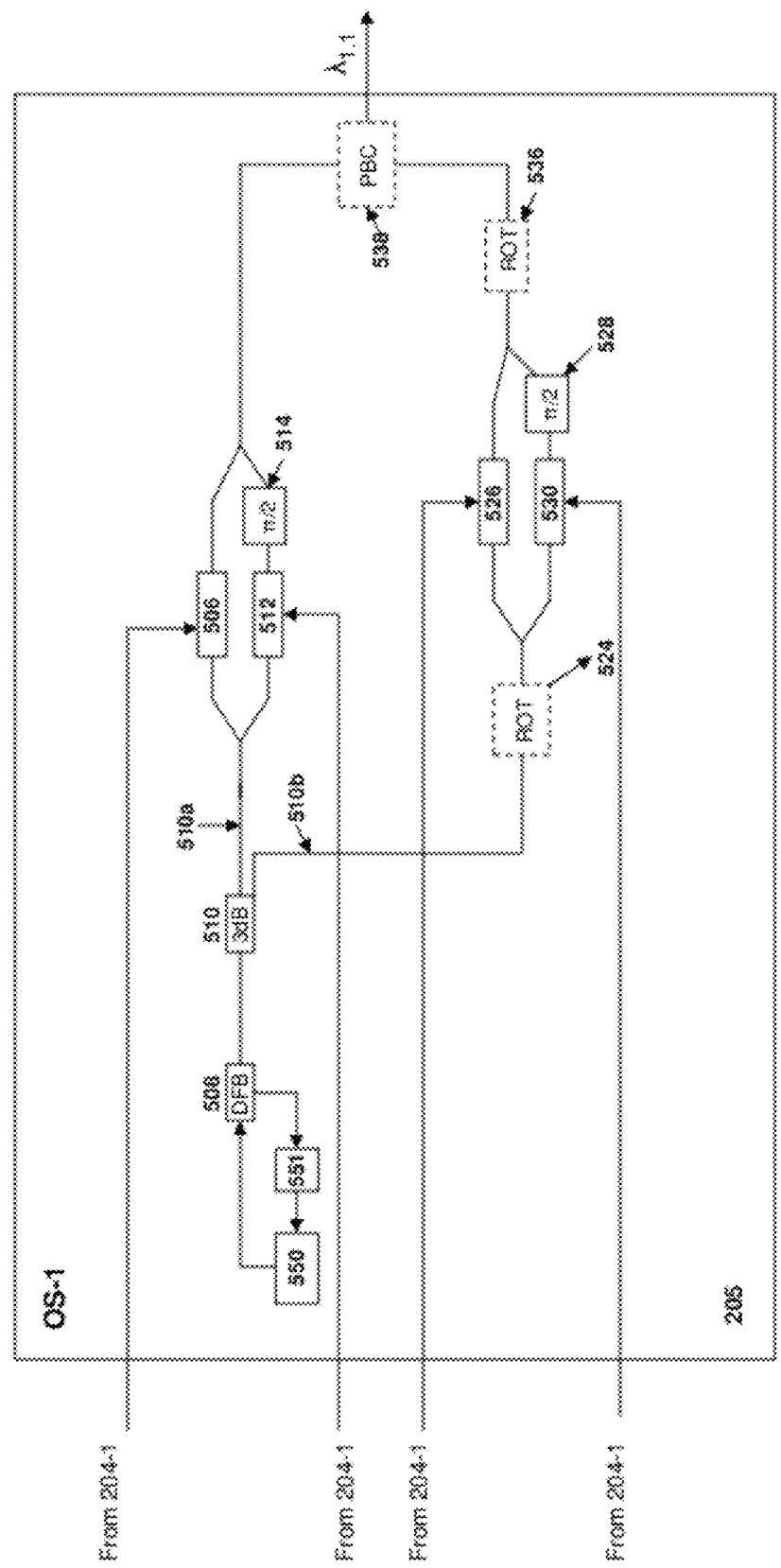
FIG. 5 illustrates a portion of a transmitter photonic integrated circuit (PIC) consistent with the present disclosure.

FIG. 5 illustrates optical source OS-1 in greater detail. It is understood that remaining optical sources OS-2 to OS-10 have the same or similar structure as optical source OS-1.

Optical source OS-1 is provided on substrate 205 and includes a laser 508, such as a distributed feedback laser (DFB) that supplies light to at least four (4) modulators 506, 512, 526 and 530. DFB 508 may output continuous wave (CW) light at wavelength λ1,1 to a dual output splitter or coupler 510 (e.g. a 3 db coupler) having an input port and first and second output ports 510a and 510b. Typically, the various components of optical source OS-1 are connected using waveguides that may be polarization dependent. A first output 510a of coupler 510 supplies the CW light to modulator 506 and modulator 512. Similarly, the second output 510b is coupled to modulator 526 and modulator 530. Modulators 506, 512, 526 and 530 may be, for example, Mach Zender (MZ) modulators. Each of the MZ modulators receives CW light from DFB 508 and splits the light between two (2) arms or paths. An applied electric field in one or both paths of a MZ modulator creates a change in the refractive index such that a phase of light output from the MZ modulator is shifted or changed relative to light input to the MZ modulator. Thus, appropriate changes in the electric field based on drive signals provided in the electrical signals 204-1 can cause the desired changes in phase of the light output from the respective MZ modulators. In accordance with a desired embodiment, modulators 506, 512, 526 and 530 are controlled to modulate the incoming light from DFB 508 according to a plurality of modulation formats such as polarization multiplexed phase shift keyed (PM-QPSK), and other quadrature amplitude modulation (QAM) formats, such as PM-8QAM, PM-16QAM or PM-32QAM.

The modulated optical signal from MZ modulator 512 is supplied to phase shifter 514 which shifts the phase of the signal 90° (π/2) to generate one of an in-phase (I) or quadrature (Q) components. The signal output from phase shifter 514 is combined with the modulated data signals from MZ modulator 506, which includes the other of the I and Q components. Similarly, MZ modulator 526 outputs modulated optical signals as one of the I and Q components, whereas MZ modulator 530 outputs the other of the I and Q components from phase shifter 528 which shifts the phase of the incoming signal 90° (π/2). A polarization rotator 524 may optionally be disposed between coupler 510 and modulators 526, 530. Polarization rotator 524 may be a two port device that rotates the polarization of light propagating through the device by a particular angle, usually an odd multiple of 90°. Alternatively, polarization rotator 536 is disposed at the combined output of modulators 526, 530 as shown. In that case, the polarization rotator 536 rotates both the modulated signals from MZ modulators 526 and 530 rather than the CW signal from DFB 508 before modulation.

In one embodiment, such as that shown in FIG. 3a for example, the combined modulated data signal from MZ modulators 526 and 530 are supplied to an input of a polarization beam combiner (PBC) 538, which combines or polarization multiplexes the two modulated signals from MZ modulators 526 and 530 with the other two modulated signals from MZ modulators 506 and 512, and outputs a polarization multiplexed optical signal having wavelength λ1,1. In this manner, one DFB laser 508 may provide a CW signal to four separate MZ modulators 506, 512, 526 and 530 for modulating the sub-wavelength channel by utilizing phase shifting and polarization rotation of the transmission signals. Alternatively, multiple CW light sources may be used for each modulator which may increase device complexity, chip real estate, power requirements and associated manufacturing costs. Additional functionality and alternative embodiments of OS-1 consistent with the present disclosure are further described in the above incorporated U.S. patent application Ser. Nos. 12/897,784 and 12/981,835.

The polarization multiplexed output from PBC 538, may be supplied to multiplexer or AWG 208 in FIG. 3a, along with the polarization multiplexed outputs having wavelength λ1,2 to λ1,n from remaining optical sources OS-2 to OS-n. Multiplexer 208, which, as noted above, may include an AWG, supplies a group of optical signals to multiplexer 14 (see FIG. 2a). Alternatively, as discussed with respect to FIG. 3c, the outputs of OS-1 to OS-n may first be multiplexed using a wavelength multiplexer or AWG 208' provided on PIC 206' and then polarization multiplexed off the PIC 206' using polarization multiplexing circuitry 295. It is understood that a PIC 206 or 206' present in each of transmitter blocks 12-2 to 12-n operates in a similar fashion and includes similar structure as PIC 206 and 206' as discussed above and shown with respect to FIGS. 3a, 3b and 5.

The above embodiments in which PIC 206 includes a plurality of optical sources OS-1 to OS-n provided on a substrate 205, enable the exemplary embodiments to closely space the sub-wavelength carriers λ1,1 to λ1,10 for each superchannel. The number of carriers for each superchannel may vary according to a specific embodiment, as determined by the optical bandwidth for example, yet it is preferred that the spacing between each carrier is optimized regardless of the number of carriers. Maintaining optimum or minimum spacing between each of the carriers depends in part on the stability of the DFB lasers 508 provided for each optical source OS-n as well as the tenability of spectral shaping functionality of the processing circuitry 202 and 606 provided in the transmit node 11 and the receive node 18, respectively. It is understood that environmental conditions, particularly changes in temperature, can seriously affect the stability of a DFB laser 508. Because the plurality of DFB lasers 508 are provided on a PIC 206 as part of each optical source OS-n, the environmental conditions for each optical source OS-n can be tightly controlled. Thus, the DFB lasers 508 can be stabilized such that they can precisely output light signals substantially at the desired closely spaced sub-wavelengths for optimizing the bandwidth of the superchannel, while enabling reliable detection at a receive node 18.

In one embodiment, the DFB lasers 508 are controlled to provide light signals at wavelengths separated by a substantially fixed spacing as shown and described above with respect to FIG. 1b. In this embodiment, a periodic wavelength locking component, or an etalon 551, in conjunction with a wavelength locking circuit 550 can be used to control or lock a DFB laser 508 to provide a light signal at a wavelength aligned with the desired carrier wavelength. It is known that an etalon exhibits periodic optical transmission characteristics, and that an etalon is characterized by a free spectral range (FSR), or the distance in optical frequency between a pair of adjacent peaks in the transmission spectrum of the etalon. The FSR of an etalon is infinitely periodic such that a single etalon 551 can be provided to substantially lock each of a plurality of DFB lasers 508, one for each carrier, at respective periodic wavelengths. In this embodiment, an etalon 551 is chosen with a FSR that matches the fixed frequency spacing Δf between the adjacent carriers. As such, the number of optical components in the transmit node 11 can be reduced and or simplified because a single optical etalon 551 is used for wavelength locking each of the DFB lasers 108 for each of the superchannels. Thus, it is advantageous that each of the carriers for superchannel SC1 and SC2 in FIG. 1b are periodically provided at substantially the same fixed frequency spacing. Detailed description of an exemplary wavelength locker system and method that may be used in an exemplary embodiment is described in greater detail in U.S. patent application Ser. No. 13/078,890, titled "Apparatus to Control Carrier Spacing in a Multi-Carrier Optical Transmitter" by John McNicol, filed on Apr. 1, 2011, the entire contents of which are incorporated by reference herein.

As noted above, the group of optical carriers or superchannel $\lambda 1$ output from transmitter block 12-1 are combined with optical signals or superchannels $\lambda 2$ to $\lambda n$ output from remaining transmitter blocks 12-2 to 12-*n* onto optical communication path 16 and transmitted to receive node 18 (see FIG. 2a). In receive node 18, demultiplexer 20 divides the incoming signals into optical signal groupings or superchannels $\lambda 1$ to $\lambda n$, such that each superchannel is fed to a corresponding one of receiver blocks 22-1 to 22-*n*. As discussed above, the superchannels $\lambda 1$ to $\lambda n$ are preferably spaced apart by a specified spectral bandwidth or guard band (GB1 shown in FIG. 1b) that enables accurate demultiplexing of the superchannels using an optical demultiplexer 20 or a programmable wavelength selective switch WSS 21 shown in FIG. 2b.

Figure 6:
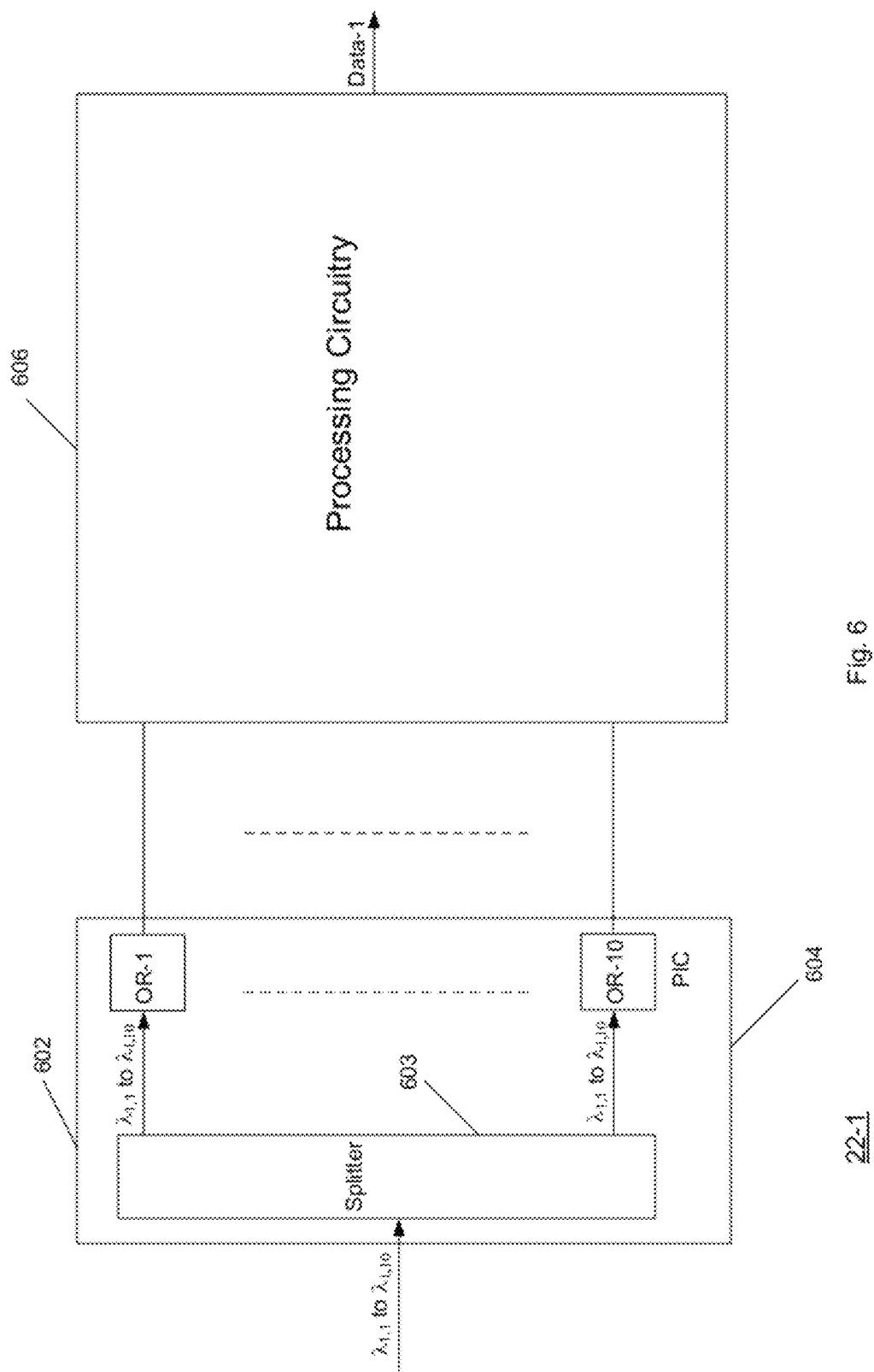
FIG. 6 illustrates a receiver block consistent with an aspect of the present disclosure.

One of receiver blocks 22-1 is shown in greater detail in FIG. 6. It is understood that remaining receiver circuitry or blocks 22-2 to 22-*n* have the same or similar structure as receiver block 22-1.

Receiver block 22-1 includes a receive PIC 602 provided on substrate 604. PIC 602 includes an optical power splitter 603 that receives a band of optical signals having wavelengths $\lambda 1,1$ to $\lambda 1,10$, centered around $\lambda 1$ for example, and supplies a power split portion of each optical signal (each of which itself may be considered an optical signal) to each of optical receivers OR-1 to OR-10. Each optical receiver OR-1 to OR-10, in turn, supplies a corresponding output to a signal processing circuit block 606, which in turn, outputs a copy of data Data-1. In one embodiment, the optical power splitter 603 may be substituted with a wavelength demultiplexer, such as an AWG configured similar to the AWG multiplexer 208 provided in transmit PIC 206 shown in FIG. 3a or a similar arrangement as that shown in FIG. 3b to separate the individual periodically spaced carriers which may then be transmitted to a respective optical receiver OR-n.

Optical receiver OR-1 is shown in greater detail in FIG. 7. It is understood that remaining optical receivers OR-2 to OR-10 have the same or similar structure as optical receiver OR-1. Optical receiver OR-1 may include a polarization beam splitter (PBS) 702 operable to receive polarization multiplexed optical signals $\lambda 1,1$ to $\lambda 1,10$ and to separate the signal into X and Y orthogonal polarizations, i.e., vector components of the optical E-field of the incoming optical signals transmitted on optical fiber medium 108*a* and 108*b*, respectively. The orthogonal polarizations are then mixed in 90 degree optical hybrid circuits ("hybrids") 720 and 724 with light from local oscillator (LO) laser 701 having wavelength $\lambda 1,1$. Hybrid circuit 720 outputs four optical signals O1*a*, O1*b*, O2*a*, O2*b* and hybrid circuit 724 outputs four optical signals O3*a*, O3*b*, O4*a*, and O4*b*, each representing the in-phase and quadrature components of the optical E-field on X (TE) and Y (TM) polarizations, and each including light from local oscillator 701 and light from polarization beam splitter 702. Optical signals O1*a*, O1*b*, O2*a*, O2*b*, O3*a*, O3*b*, O4*a*, and O4*b* are supplied to a respective one of photodetector circuits 709, 711, 713, and 715. Each photodetector circuit includes a pair of photodiodes (such as photodiodes 709-1 and 709-2) configured as a balanced detector, for example, and each photodetector circuit supplies a corresponding one of electrical signals E1, E2, E3, and E4. Alternatively, each photodetector may include one photodiode (such as photodiode 709-1) or a single-ended photodiode. Electrical signals E1 to E4 are indicative of data carried by optical signal of $\lambda 1,1$ as extracted by the optical hybrids 720 and 724 according to the LO 701 tuned to $\lambda 1,1$. For example, these electrical signals may comprise four base-band analog electrical signals linearly proportional to the in-phase and quadrature components of the optical E-field on X and Y polarizations. As similarly discussed with respect to the transmit PIC 206, the LO 701 of each optical receiver can be precisely tuned according to the desired sub-wavelength $\lambda 1,1$, using wavelength locking circuitry 750 in conjunction with an etalon 751, for example, to reliably extract the sub-wavelength carrier $\lambda 1,1$ from the other densely packed sub-carrier wavelengths $\lambda 1,2$ to $\lambda 1,10$ of the received superchannel.

The signal processing circuit block 606 may include known transimpedance amplifier and automatic gain control (TIA/AGC) circuitry, for example, and one or more filters for filtering the electrical signals E1, E2, E3 and E4. Additional circuitry, such as an analog-to-digital converter may be provided to sample the electrical signals at the same rate or a less rate as the sampling performed in the processing circuitry 202 discussed with respect to transmit block 12-1 in FIG. 3a. Other digital signal processing (DSP) circuitry may be provided, such as a FIFO interpolation and filter circuit and spectral shaping filters to further process the received signals, as well as circuitry to perform known equalization, carrier recovery and other demodulation functions. The use of electronic or digital spectral shaping filters in processing circuit block 606, enables the electronic separation of the data carried by each of the sub-wavelength channels (e.g. $\lambda 1,1$ to $\lambda 1,10$) of superchannel wavelength $\lambda 1$, as opposed to optically demultiplexing such data. Such electronic or digital filters are provided with a sharp roll-off characteristic such that the minimally spaced carriers or sub-wavelength channels can be reliably separated at the receiver. Electrical filtering of the baseband signals is enabled by the exemplary signal detection techniques discussed above in which the individual carriers can be separated according to the LO 701 tuned to the desired carrier wavelength.

The operation and structure of an interpolation and filter circuit and other functionality of the signal processing circuit block 606 are described in greater detail in U.S. patent application Ser. No. 12/791,694 titled "Method, System, And Apparatus For Interpolating An Output Of An Analog-To-Digital Converter", filed Jun. 1, 2010, and in U.S. patent application Ser. No. 12/897,784, referenced above, the entire contents of each of which are incorporated herein by reference.

In accordance with the above systems and methods, the optical communication system 100 shown in FIG. 1a can be configured to transmit a plurality of superchannels SC1, SC2 and SC3, for example, between a plurality of nodes N1 to N14 as desired. Exemplary methods for configuring a carrier plan for the superchannels SC1, SC2 and SC3 are discussed further below.

In accordance with one embodiment, the three optical signals or superchannels SC1, SC2 and SC3 shown in FIG. 1a may each be modulated using different modulation formats. As discussed above, the modulation format of an optical signal may be determined based on the desired reach or distance the signal is required to span or travel. For example, a lower order polarization multiplexed quadrature phase shift keyed (PM-QPSK) modulation format transmitting 4 bits per symbol, that is less susceptible to noise and filtering effects in the optical communication system 100, may be employed for the optical signal or superchannel SC1 spanning a great distance from node N1 to node N5. More complex modulation formats may utilize known higher order quadrature amplitude modulation (QAM) techniques of varying complexity according to shorter transmission distances. For example, the second superchannel SC2 spanning an intermediate distance between node N1 and node N4 may be modulated with 6 bits per symbol according to polarization multiplexed 8-QAM (PM-8QAM). Further, the third superchannel SC3 spanning the shorter distance from node N1 to node N3 may be modulated with 8 bits per symbol according to polarization multiplexed 16-QAM (PM-16QAM).

As discussed above, and as shown in FIG. 1b, a superchannel SC1, for example, preferably comprises a number of minimally spaced optical carriers, such as $\lambda 1,1$ to $\lambda 1,10$. The bandwidth occupied by a single optical carrier of the superchannel is determined in part by the bit rate carried on the carrier (including overhead for framing and forward error correction), the modulation format chosen, and the pulse shaping used, as controlled by signal processing circuitry 202 discussed above in FIG. 3a, for example.

In one embodiment, the occupied bandwidth of a superchannel is selected to conform to the standard ITU grid, such that the bandwidth occupies a spectrum that is a multiple of 25 GHz or 50 GHz, and a center frequency of the superchannel, $\lambda 1$ shown in FIG. 1b for example, is selected to be at or near a frequency specified by the ITU grid. For example, a superchannel SC1, shown in FIG. 1b, is allotted a bandwidth of 250 GHz centered around an ITU frequency or wavelength $\lambda 1$. According to a customer's data requirement, it may be desired that the superchannel SC1 carries a data capacity of 500 Gb/s. To meet the customer's data requirements and optimize the occupied bandwidth, it is determined that each carrier may provide 50 Gb/s of data using QPSK modulation, for example. In this embodiment, ten individual carriers $\lambda 1,1$ to $\lambda 1,10$ are needed in the superchannel to provide a data capacity of 500 Gb/s. The carrier spacing can then be optimized according to the number of carriers needed to provide the full data capacity plus an additional carrier that is unused for providing a guard band GB1 between adjacent superchannels. Accordingly, in this embodiment, the individual carrier spacing is determined based on eleven carriers (ten plus one). As such, the individual carrier spacing, or $\Delta f$ in FIG. 1b, is determined to be approximately 22.73 GHz. In accordance with this embodiment, a constant carrier spacing of 22.73 GHz is preferably used for each carrier in each superchannel output from a single node 11, shown in FIG. 2a, as discussed above.

The present disclosure is not limited to the above embodiment. For example, the data rate for each carrier is preferably determined according to a specific implementation that balances optimum performance in the optical communication system, at a minimal cost, that also satisfies the unique or specific requirements of a customer. Thus, according to one embodiment, the occupied bandwidth of each superchannel may not conform to the standard ITU grid in that it is not a multiple of 25 GHz, for example. The above embodiments enable flexible bandwidth allocation for each superchannel such that a plurality of superchannels with varying number of carriers utilizing different modulation rates and providing varying total data capacity can be utilized.

The carrier spacing for each of the superchannels is determined in part by the symbol rate utilized for each carrier, thus, it is advantageous to use a fixed sample rate or symbol rate for each of the carriers in an exemplary embodiment. At a fixed sample rate, the bandwidth of each carrier, or the fixed spacing for each carrier can be substantially maintained regardless of a modulation format chosen for each carrier. Accordingly, because the bandwidth of the carriers maintains a substantially fixed spacing regardless of the modulation format employed, one or more fixed spacing AWGs provided in multiplexer 208 can be configured to multiplex the plurality of carriers modulated according to the plurality of modulation formats for each superchannel. Additionally, a single etalon 551 can also be used, for example, to lock the wavelength of each of the DFB lasers 508 at periodic wavelengths defined by the fixed spacing. From the above example, the bit rates for each carrier would range from 50, 75 and 100 Gb/s, according to the selected modulation format of PM-QPSK, PM-8QAM and PM-16QAM, respectively. Therefore, the total capacity of each superchannel, and the occupied bandwidth of each superchannel can be varied according to the number of carriers utilized in each superchannel.

In the exemplary embodiments, a PIC 206 shown in FIG. 3a is preferably configured to support a plurality of modulation formats at a given symbol rate or baud rate. Therefore, a PIC 206 can be configured to output a superchannel with a varying number of carriers selected according to a modulation format. Accordingly, each PIC 206 is preferably configured to support a number of carriers needed to output a specific data capacity suitable for each customer. Therefore, with reference to FIG. 3a, a transmitter block 12-n of PIC 206 is preferably configured with any number of optical sources OS-1 to OS-n needed to realize a desired data capacity. Due to the periodic characteristics of known AWGs, and etalon wavelength lockers, for example, a single component of each of these may be utilized for all of the superchannels even if each superchannel utilizes a different number of carriers. In such a case, each of the superchannels provided from a single transmit node 11 is preferably configured to occupy adjacent optical bandwidth so as to efficiently utilize the available optical bandwidth.

In other embodiments, the number of carriers and the total data capacity, as well as the modulation format selected for each carrier, can be varied according to the embodiments disclosed in commonly-assigned U.S. patent application Ser. No. 13/078,895, titled "Multiplexer and Modulation Arrangements for Multi-Carrier Optical Modems" by John McNicol, filed on Apr. 1, 2011, the entire contents of which are incorporated by reference. In each of the embodiments, however, each of the carriers provided in each superchannel output from a single transmit node 11, preferably utilizes a common fixed spacing, regardless of the specific embodiment, as discussed above.

Other embodiments will be apparent to those skilled in the art from consideration of the specification. It is intended that the specification and examples be considered as exemplary only, with a true scope and spirit of the invention being indicated by the following claims.

What is claimed is:

1. An apparatus, comprising:
a first optical transmitter configured to supply a plurality of first optical signals, each of the plurality of first optical signals being spaced apart from one another spectrally by a first spacing, the plurality of first optical signals constituting a first superchannel, each of the plurality of first optical signals having a corresponding one of a plurality of first wavelengths;
a second optical transmitter configured to supply a plurality of second optical signals, each of the plurality of second optical signals being spaced apart from one another spectrally by the first spacing, the plurality of second optical signals constituting a second superchannel, each of the plurality of second optical signals having a corresponding one of a plurality of second wavelengths;
a wavelength selective switch (WSS) that receives the first superchannel and the second superchannel, wherein a maximum one of the plurality of first wavelengths and a minimum one of the plurality of second wavelengths are spaced apart spectrally from one another by a second spacing that is greater than the first spacing, the first spacing being less than 25 GHz, the WSS having first and second outputs, the first output supplying the first superchannel and the second output supplying the second superchannel, the first superchannel including a first one of the first plurality of optical signals having a first modulation format and a second one of the first plurality of optical signals having a second modulation format that is different than the first modulation format,
wherein each of the plurality of first optical signals has a symbol rate and each of the plurality of optical signals in the second superchannel has said symbol rate; and
an optical receiver that receives a plurality of third optical signals, the optical receiver including a local oscillator laser, wavelength locking circuitry, and an etalon, the wavelength locking circuitry and etalon being configured to tune the local oscillator laser.

2. The apparatus of claim 1, wherein the second spacing is twice the first spacing.

3. The apparatus of claim 1, further including a multiplexer that combines the first and second superchannels and supplies the first and second super channels to the WSS, wherein the multiplexer comprises a first filtering component for filtering a first subset of the plurality of first and second optical signals, a second filtering component for filtering a second subset of the plurality of first and second optical signals, and a combiner for combining an output of the first filtering component and an output of the second filtering component.

4. The apparatus of claim 1, wherein the first optical transmitter includes a first plurality of optical sources and the second optical transmitter includes a second plurality of optical sources, each the first plurality of optical sources supplies a corresponding one of the plurality of first optical signals and each of the second plurality of optical sources supplies a corresponding one of the plurality of second optical signals, said each of the first plurality of optical sources being controlled by a periodic wavelength locking component.

5. The apparatus of claim 1, further including:
a first substrate, the first transmitter being provided on the first substrate; and
a second substrate, the second transmitter being provided on the second substrate.

6. An apparatus, comprising:
a plurality of optical sources, each configured to supply a plurality of optical signals,
a first subset of the plurality of optical signals constituting a first superchannel, and a second subset of the plurality of optical signals constituting a second superchannel, the first and second superchannels being spectrally spaced apart by a first spacing, the first spacing being greater than 25 GHz, each of the plurality of optical signals in the first subset having a corresponding one of a plurality of wavelengths that are spectrally spaced apart from one another by a second spacing;
a wavelength selective switch (WSS) receiving the first and second superchannels and having first and second outputs, the first output supplying the first superchannel and the second output supplying the second superchannel, the first superchannel including a first one of the plurality of optical signals having a first modulation format and a second one of the plurality of optical signals having a second modulation format that is different than the first modulation format,
wherein each optical signal in the first subset of the plurality of optical signals has a symbol rate and each optical signal in the second subset of the plurality of optical signals has said symbol rate; and
an optical receiver that receives another plurality of optical signals, the optical receiver including a local oscillator laser, wavelength locking circuitry, and an etalon, the wavelength locking circuitry and etalon being configured to tune the local oscillator laser.

7. The apparatus of claim 6, wherein the first and second superchannels are spaced apart by a spacing twice the second spacing.

8. The apparatus of claim 6, further including a substrate, a subset of the plurality of optical sources being provided on the substrate.

9. The apparatus of claim 6, wherein the first spacing is other than a spacing that conforms to an International Telecommunications Union (ITU) grid.

10. An apparatus, comprising:
a first plurality of optical sources, each of which supplying a corresponding one of a first plurality of optical signals, each of the first plurality of optical signals having a corresponding one of a first plurality of wavelengths;
a second plurality of optical sources, each of which supplying a corresponding one of a second plurality of optical signals, each of the second plurality of optical signals having a corresponding one of a second plurality of wavelengths;
a wavelength selective switch (WSS) configured to receive the first plurality of optical signals and the second plurality of optical signals, the WSS having first and second outputs, the first output supplying the first superchannel and the second output supplying the second superchannel, the first superchannel including a first one of the first plurality of optical signals having a first modulation format and a second one of the first plurality of optical signals having a second modulation format that is different than the first modulation format,
wherein each of the first plurality of wavelengths are spectrally spaced from one another by a first spacing, and each of the second plurality of optical signals is spectrally spaced from one another by the first spacing, a maximum one of the first plurality of wavelengths being spaced from a minimum one of the second plurality of wavelengths by a second spacing that is twice the first spacing, the first spacing being less than 25 GHz, wherein each of the first plurality of optical signals has a symbol rate and each of the second plurality of optical signals has said symbol rate; and an optical receiver that receives a third plurality of optical signals, the optical receiver including a local oscillator laser, wavelength locking circuitry, and an etalon, the wavelength locking circuitry and etalon being configured to tune the local oscillator laser.

11. The apparatus of claim 10, further comprising:

a first substrate, each of the first plurality of optical sources being provided on the first substrate; and a second substrate, each of the second plurality of optical sources being provided on the second substrate.

12. The apparatus of claim 10, further including a multiplexer that combines the first and second superchannels onto an optical path, the first and second superchannels propagating along the optical path to the WSS, wherein the multiplexer comprises a first filtering component for combining the first plurality of optical signals, a second filtering component for combining the second plurality of optical signals, and a combiner for combining an output of the first filtering component and an output of the second filtering component.

* * * * *